1,998,330

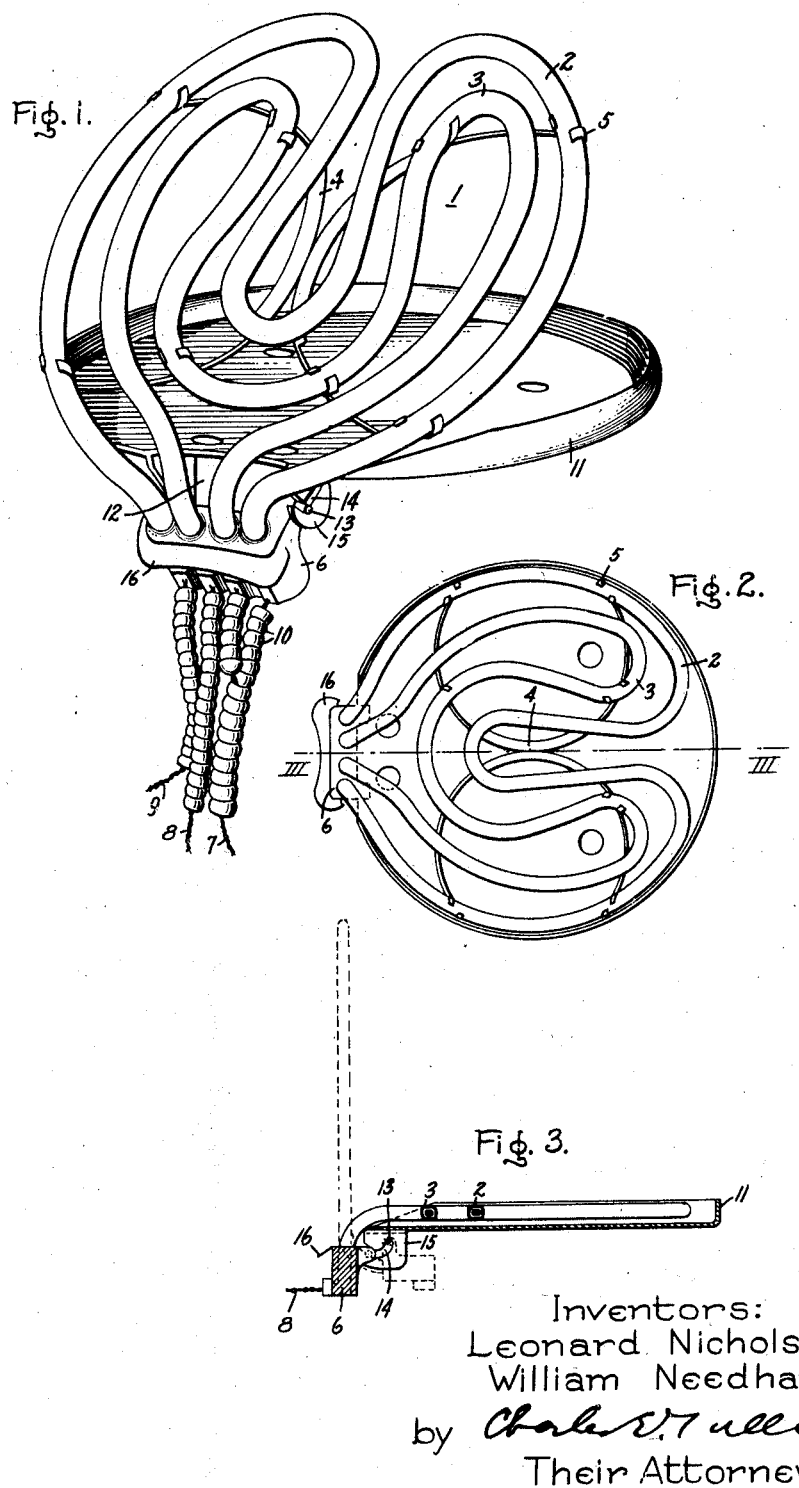
Inventors:
Leonard Nicholson,
William Needham,
by Charles E. Tullar
Their Attorney Patented Apr. 16, 1935

UNITED STATES PATENT OFFICE 1,998,330

ELECTRIC HEATER

Leonard Nicholson, Woodford, Stockport, and William Needham, Sale, England, assignors to General Electric Company, a corporation of New York Application October 20, 1931, Serial No. 570,020
In Great Britain November 5, 1930

4 Claims. (Cl. 219—37)

This invention relates to electric heaters, more particularly to electrically heated hot plates, and has for its object the provision of an improved heating device of this character.

In electrically heated hot plates as commonly constructed the heating element is cast or permanently embedded in a dish or pan which latter acts in the capacity of a cover for protecting the element from injury and for receiving and conducting heat to the object to be heated.

In an improved construction according to the present invention the hot plate comprises a heating element consisting of an insulated resistance element in the form of a grid, or flat spiral for example, and a shallow dish or pan which serves as a back plate for the heating element and is designed to have good heat reflecting properties on its inner surface. The heating element is hinged to the dish or pan so that it may be tilted out of the pan in order to enable the latter to be cleaned, or to afford a convenient indication that the heating element is not in condition to receive an object to be heated and so forth.

Preferably the heating element is reinforced by members serving when in contact with the base of the dish to support said heating element.

If desired, suitable switches may be inserted in the connecting leads to the electrical resistance element of the heating grid or spiral, such switches being actuated by the aforesaid tilting of the grid thereby to disconnect the resistance element from its associated power supply.

For a more complete understanding of the invention, reference should be had to the accompanying drawing, in which: Fig. 1 is a perspective view of an electrically heated hot plate constructed in accordance with the invention, the heating element being shown as tilted out of its pan; Fig. 2 is a plan view of the hot plate drawn to a reduced scale; and Fig. 3 is a sectional view taken along the line III—III of Fig. 2.

Referring to the drawing, at 1 is shown a heating grid which consists of two heating elements 2 and 3 comprising electrical resistances embedded in suitable insulating material and provided with a protective cover or sheath preferably of metal. One form of such a heating unit is described and claimed in the U. S. Patent No. 1,367,341, granted to C. C Abbott February 1, 1921. The heating elements 2 and 3 are coiled in flat zigzag formation as shown and are reinforced by a spider 4 to which the elements 2 and 3 are securely clamped by means of clamps 5 which conveniently may be formed integral with the spider 4, being preferably secured by welding or brazing to the heating elements 2 and 3 to ensure rigidity of the grid as a whole.

The ends of the heating elements 2 and 3 are brought out together and secured in a terminal block 6 as shown. Electrical connection to their enclosed resistance elements is effected by means of leads 7, 8 and 9. The lead 7 is for convenience connected to one end of the resistance of each of the elements 2 and 3, while the leads 8 and 9 are connected to the other ends of the resistances for these elements. The leads 7, 8 and 9 are suitably insulated by ceramic discs 10 which ensure flexibility.

The heating grid 1 is adapted to be received in a shallow pan or dish 11 of polished stainless steel or aluminum or other metal which is given a lasting bright finish, as for example by chromium deposition.

The rim of the pan 11 is cut away and the base of the pan recessed as shown at 12 and the terminal block 6 is pivoted adjacent said recess so that the heating grid 1 can be tilted or swung as a unit out of the pan 11. For this purpose the terminal block 6 is provided with projections or pins 13 which are received in slots 14 formed in brackets 15 suitably secured to the pan 11. The pins 13 serve as pivots about which the grid 1 can be swung. The slots 14 extend to the edges of the brackets 15 as shown, to form open bearings for the pivots 13 whereby the heating grid 1 can be removed clear of the pan 11 if desired, as for example may be necessary when a resistance element develops a fault and requires to be replaced. It is to be noted that the slots 14 are formed of substantially U-formation so that, when the heating grid 1 is tilted, the pivots 13 move under the pan so that terminal block 6 does not extend appreciably beyond the edge of the pan.

An extension 16 on the terminal block 6 serves as a drip shield to protect the connections 7, 8, 9 to the resistance elements.

In service the object to be heated is supported directly on the heating grid 1 which in turn is supported by engagement of the spider 4 with the bottom of the pan 11, the pan serving as a back-plate for the heating grid 1 and also, by reason of its aforesaid bright finish, serving as a heat reflector.

By mounting the heating grid 1 so that it can be tilted or swung out of the pan 11, the interior of the latter can readily be maintained clean and, moreover, a convenient indication is afforded as to whether or not the heating grid 1 is in operative condition to receive an object to be heated.

If desired, the ends of the enclosed resistance elements of the heating grid may be brought out through the terminal block to switch blades which make and break connection repeatedly, with associated fixed terminals connected to the supply mains when the heating grid is in its operative position or swung out of the reflecting dish or pan.

It is to be understood that various modifications may be made without departing from the scope of the invention. Thus, the heating grid may have other shapes than that illustrated in the drawing, for example the heating grid may be in the form of a flat spiral. Moreover, the heating grid may be pivoted in any suitable form of bearing or it may even rest on ledges secured to the pan whereby it can be removed clear of the pan if desired instead of being only swung out of position.

What we claim as new and desire to secure by Letters Patent of the United States, is—

1. An electric hot plate comprising a shallow flat receptacle provided with a reflecting surface on the inner side of its bottom wall arranged to reflect heat rays upwardly from said surface, a heating element formed into a grid having substantially the same contour as said shallow pan resting upon and substantially covering the total area of said reflecting surface, and further, arranged so that when it is positioned within said receptable the upper surface of said grid lies in a plane above the upper edge of the side wall of said receptacle so that articles placed upon said hot plate to be heated are supported directly on said grid out of contact with said side wall, the end portions of said heating element extending laterally from said receptacle in the plane of said grid, said side wall having a portion cut away so as to provide an opening through which said end portions project from said receptacle, a terminal block for said heating element, means rigidly securing the end portions of said heating element to said terminal block, hinge lugs secured to said receptacle adjacent said terminal block, and means pivotally and removably securing said terminal block to said hinge lugs.

2. An electric hot plate comprising a pan member provided with a heat reflecting surface, a sheathed heating element formed into a grid having terminal portions, a reenforcing spider for said grid resting on said reflecting surface supporting said grid so that it extends above the edges of said pan whereby articles can be heated directly thereon, the terminal portions of said grid projecting laterally from said receptacle substantially in the plane of said grid and then turned downwardly and the side wall of said receptacle being cut away to provide an opening through which said terminal portions project, a terminal block secured to said downwardly extended portions below the bottom wall of said receptacle, hinge lugs secured to said receptacle beneath its bottom wall and means connecting said terminal block to said hinge lugs.

3. An electric heater comprising a heating element having terminal portions, a shallow pan-like receptacle receiving said heating element provided with a heat reflecting bottom wall upon which said heating element rests, terminal portions of said heating element projecting laterally from said receptacle in the plane of said heating element and then extending downwardly toward said bottom wall, the side wall of said receptacle having a portion cut away to provide an opening through which said terminal portions project from said receptacle, a terminal member secured to said terminal portions, hinge lugs secured to the under surface of said receptacle opposite said reflecting surface and means pivotally connecting said terminal member to said hinge lugs whereby said heating element can be swung out of and returned to said receptacle.

4. An electric hot plate comprising a sheathed heating element formed into a grid having end terminal portions turned downwardly from the general plane of said grid, a terminal block secured to said terminal portions, a shallow supporting receptacle for receiving said grid, the side and bottom walls of said receptacle having cut away portions providing an opening for said downwardly turned terminal portions, said terminal block being positioned below the plane of said bottom wall when said grid is placed within said receptacle, hinge means pivotally connecting said heating element with said receptacle comprising pins on said terminal block, and hinge brackets on said bottom wall provided with elongated slots receiving said pins arranged to provide for movement of said terminal block under the bottom of said receptacle when said heating element is raised upwardly from said receptacle to an open position.

LEONARD NICHOLSON.
WILLIAM NEEDHAM.